United States Patent
Yang

(10) Patent No.: US 11,570,624 B2
(45) Date of Patent: Jan. 31, 2023

(54) INTEGRITY PROTECTION METHOD, TERMINAL AND BASE STATION

(71) Applicant: VIVO MOBILE COMMUNICATION CO.,LTD., Guangdong (CN)

(72) Inventor: Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 358 days.

(21) Appl. No.: 16/649,117

(22) PCT Filed: Sep. 10, 2018

(86) PCT No.: PCT/CN2018/104819
§ 371 (c)(1),
(2) Date: Mar. 19, 2020

(87) PCT Pub. No.: WO2019/056959
PCT Pub. Date: Mar. 28, 2019

(65) Prior Publication Data
US 2020/0296588 A1    Sep. 17, 2020

(30) Foreign Application Priority Data

Sep. 22, 2017   (CN) .......................... 201710867732.4

(51) Int. Cl.
*H04W 12/106*    (2021.01)
*H04W 76/27*    (2018.01)
(Continued)

(52) U.S. Cl.
CPC ......... *H04W 12/106* (2021.01); *H04W 76/27* (2018.02); *H04L 63/123* (2013.01); *H04W 80/02* (2013.01)

(58) Field of Classification Search
CPC combination set(s) only.
See application file for complete search history.

(56) References Cited

U.S. PATENT DOCUMENTS 10,433,176 B2 * 10/2019 Dudda ................ H04W 12/106
11,044,609 B2 *  6/2021 Yang ..................... H04W 12/03
(Continued)

FOREIGN PATENT DOCUMENTS

| CN | 102142942 A | 8/2011 |
| CN | 103188681 A | 7/2013 |
| CN | 104936169 A | 9/2015 |

OTHER PUBLICATIONS

European Search Report in Application No. 18858196.1 dated Sep. 25, 2020.
(Continued)

*Primary Examiner* — Hanh N Nguyen
(74) *Attorney, Agent, or Firm* — Maschoff Brennan

(57) ABSTRACT

An integrity protection method, a terminal and a base station are provided. The integrity protection method, which is applied to a terminal, includes: performing an integrity protection check on data packets transmitted on a DRB, a split bearer corresponding to the DRB or a logical channel corresponding to the DRB, and determining whether an integrity protection of the DRB fails based on a result of the integrity protection check; and when it is determined that the integrity protection of the DRB fails, suspending the DRB or continuing receiving data packets carried by the DRB.

20 Claims, 5 Drawing Sheets

(51) Int. Cl.
*H04L 9/40* (2022.01)
*H04W 80/02* (2009.01)

(56) References Cited

U.S. PATENT DOCUMENTS

| | | | |
|---|---|---|---|
| 2009/0181643 A1* | 7/2009 | Thakare | H04W 12/06 |
| | | | 455/411 |
| 2012/0182929 A1 | 7/2012 | Chen et al. | |
| 2017/0181216 A1* | 6/2017 | Worrall | H04W 76/15 |
| 2019/0253895 A1* | 8/2019 | Xu | H04W 36/0038 |
| 2019/0297502 A1* | 9/2019 | Jo | H04W 88/023 |

OTHER PUBLICATIONS

"Consideration on the remaining security issues" 3GPP TSG-RAN WG2 Meeting #99, Aug. 21, 2017.
"Consideration on MN/UE action in case of DRB integrity protection failure" 3GPP TSG RAN WG2#NR AdHoc#2, Jun. 27, 2017.
"Integrity protection and Counter Check Procedure for NR" 3GPP TSG-RAN WG2 Meeting #98, May 15, 2017.
Written Opinion and International Search Report in Application No. PCT/CN2018/104819 dated Apr. 2, 2020.
"Response LS on security keys in EN-DC and actions upon DRB IP check failure" 3GPP TSG RAN WG2#99, Aug. 21, 2017.
"Further consideration on integrity check failure" 3GPP TSG-RAN WG2 Meeting #99, Aug. 21, 2017.

* cited by examiner

Transmitting, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration ~51
Fig. 5
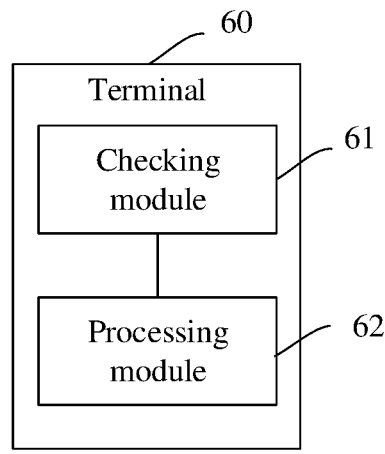
Fig. 6
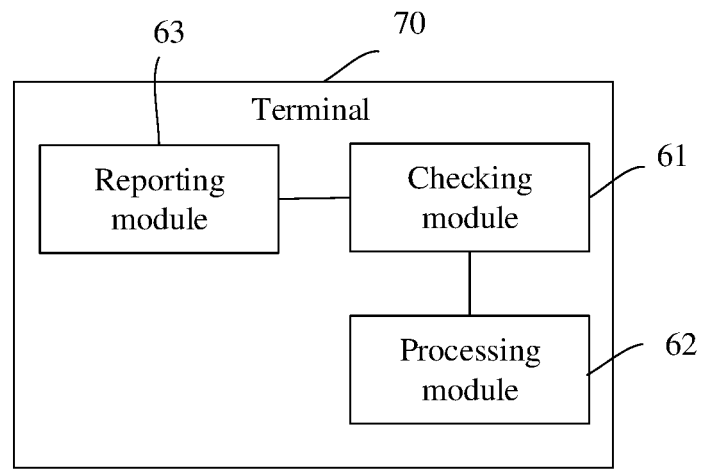
Fig. 7

INTEGRITY PROTECTION METHOD, TERMINAL AND BASE STATION

CROSS-REFERENCE TO RELATED APPLICATION

The present application is the U.S. national phase of PCT Application No. PCT/CN2018/104819 filed on Sep. 10, 2018, which claims a priority to Chinese patent application No. 201710867732.4 filed in China on Sep. 22, 2017, the disclosures of which are incorporated in their entirety by reference herein.

TECHNICAL FIELD

The present disclosure relates to the field of radio communication technologies, and in particular to an integrity protection method, a terminal and a base station.

BACKGROUND

In a long term evolution (LTE) system, encryption processing is performed on control plane message at radio resource control (RRC) layer. In addition, integrity protection is implemented for the control plane message of the RRC layer to prevent data tampering, that is, integrity verification information is carried at a transmitting end and an integrity protection check is performed by using the integrity verification information at a receiving end.

However, in LTE and 5G new radio (NR) systems, no integrity protection scheme is provided for the transmission and reception of service data of user plane. As a result, it is difficult to prevent tampering of service data.

In 5G NR discussion, 3GPP Security Working Group (SA3) has reached an agreement that integrity protection also needs to be implemented for data of user plane, i.e., data carried on a data radio bearer (DRB). That is, integrity verification information is carried at a transmitting end and an integrity protection check is performed by using received integrity verification information at a receiving end. If the integrity protection check succeeds, it is determined that the data is not tampered with. If the check fails, it is discovered that the data is tampered with, then it is determined that integrity protection of the data fails.

However, it is still not clear as to how to determine whether the DRB integrity protection fails and how to handle the data carried by the DRB after it is determined the DRB integrity protection fails.

SUMMARY

In a first aspect, the present disclosure provides in some embodiments an integrity protection method, applied to a terminal, including: performing an integrity protection check on data packets transmitted on a DRB, a split bearer corresponding to the DRB or a logical channel corresponding to the DRB, and determining whether an integrity protection of the DRB fails based on a result of the integrity protection check; and suspending the DRB or continuing receiving data packets carried by the DRB, in a case that it is determined that the integrity protection of the DRB fails.

In a second aspect, the present disclosure provides in some embodiments an integrity protection method, applied to a base station, including: transmitting, to a terminal, relevant configuration used in performing an integrity protection check on data packets transmitted on a DRB, a split bearer corresponding to the DRB or a logical channel corresponding to the DRB, where the terminal determines whether an integrity protection of the DRB fails based on the relevant configuration.

In a third aspect, the present disclosure provides in some embodiments a terminal, including: a checking module, configured to perform an integrity protection check on data packets transmitted on a DRB, a split bearer corresponding to the DRB or a logical channel corresponding to the DRB, and determine whether an integrity protection of the DRB fails based on a result of the integrity protection check; and a processing module, configured to suspend the DRB or continue receiving data packets carried by the DRB, in a case that it is determined that the integrity protection of the DRB fails.

In a fourth aspect, the present disclosure provides in some embodiments a base station, including: a configuration module, configured to transmit, to a terminal, relevant configuration used in performing an integrity protection check on data packets transmitted on a DRB, a split bearer corresponding to the DRB or a logical channel corresponding to the DRB, where the terminal determines whether an integrity protection of the DRB fails based on the relevant configuration.

In a fifth aspect, the present disclosure provides in some embodiments a terminal, including: a processor, a memory and a program stored in the memory and executable by the processor, where the processor is configured to execute the program, to implement steps of the foregoing integrity protection method applied to the terminal.

In a sixth aspect, the present disclosure provides in some embodiments a base station, including: a processor, a memory and a program stored in the memory and executable by the processor, where the processor is configured to execute the program, to implement steps of the foregoing integrity protection method applied to the base station.

In a seventh aspect, the present disclosure provides in some embodiments a computer readable storage medium, having a program stored thereon, when the program is executed by a processor, steps of the foregoing integrity protection method applied to the terminal are implemented.

In an eighth aspect, the present disclosure provides in some embodiments a computer readable storage medium, having a program stored thereon, when the program is executed by a processor, steps of the foregoing integrity protection method applied to the base station are implemented.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative efforts.

FIG. 5 is a schematic flow diagram of an integrity protection method according to a third embodiment of the present disclosure;

FIG. 6 is a schematic structural diagram of a terminal according to a fourth embodiment of the present disclosure;

FIG. 7 is a schematic structural diagram of a terminal according to a fifth embodiment of the present disclosure;

DETAILED DESCRIPTION

To describe the object, the technical solutions and the advantages of the embodiments of the present disclosure more clearly, the following clearly describes the technical solutions according to the embodiments of the present disclosure with reference to the accompanying drawings in the embodiments of the present disclosure. Apparently, the embodiments in the following description are merely a part rather than all of the embodiments of the present disclosure. All other embodiments obtained by a person of ordinary skill in the art based on the embodiments of the present disclosure without creative efforts shall fall within the protection scope of the present disclosure.

In order to clearly specify as to how to determine whether the DRB integrity protection fails and how to handle the data carried by the DRB after it is determined the DRB integrity protection fails, the present disclosure provides in some embodiments an integrity protection method, a terminal and a base station.

Figure 1:
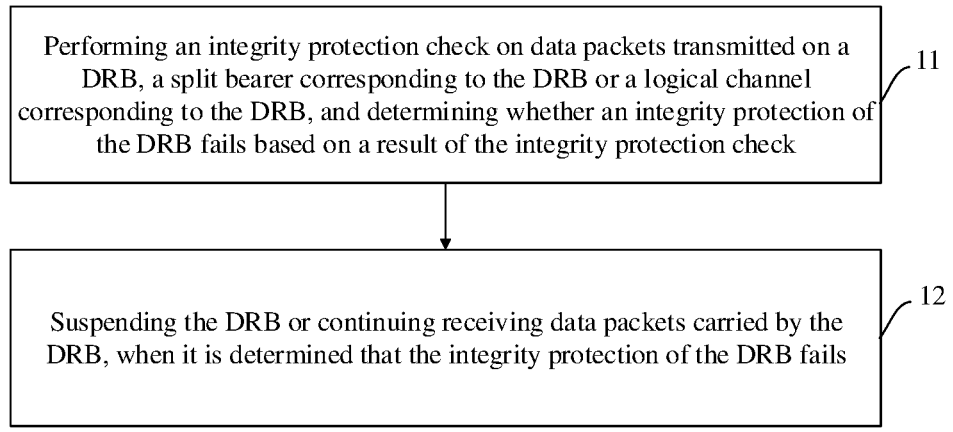
FIG. 1 is a schematic flow diagram of an integrity protection method according to a first embodiment of the present disclosure.

Referring to FIG. 1, a schematic flow diagram of an integrity protection method according to a first embodiment of the present disclosure is provided. The integrity protection method is applied to a terminal and includes step 11 to step 12.

The step 11 includes: performing an integrity protection check on data packets transmitted on a DRB, a split bearer corresponding to the DRB or a logical channel corresponding to the DRB, and determining whether an integrity protection of the DRB fails based on a result of the integrity protection check.

The step 12 includes: suspending the DRB or continuing receiving data packets carried by the DRB, in a case that it is determined that the integrity protection of the DRB fails.

In the embodiments of the present disclosure, a method, in which the terminal may perform an integrity protection check by checking data packets transmitted on a DRB, a split bearer corresponding to the DRB or a logical channel corresponding to the DRB, and determine whether an integrity protection of the DRB fails based on a result of the integrity protection check, is clearly specified; and, it is also specified that the terminal may suspend the DRB or continue receiving data packets carried by the DRB in a case that it is determined that the integrity protection of the DRB fails.

Figure 2:
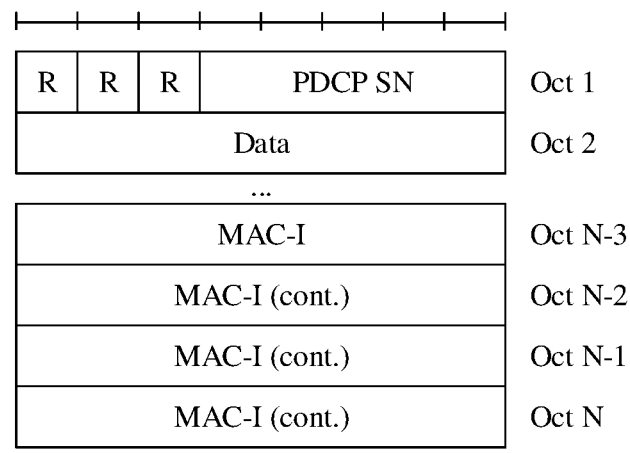
FIG. 2 illustrates a format of a data packet carrying integrity verification information according to some embodiments of the present disclosure.

In some embodiments of the present disclosure, after the integrity protection function is configured for a DRB, when a base station transmits data packets to a terminal via the DRB, integrity verification information is carried. The terminal may perform an integrity protection check on received data packets by using the integrity verification information. For a format of a data packet carrying integrity verification information, a reference may be made to FIG. 2, wherein Data refers to data, and MAC-I refers to integrity verification information carried by the data packet.

In some embodiments of the present disclosure, the data packet is a packet data convergence protocol (PDCP) protocol data unit (PDU) or a PDCP service data unit (SDU).

In some embodiments of the present disclosure, whether the terminal performs the integrity protection check based on data packets transmitted on the DRB, data packets transmitted on a split bearer corresponding to the DRB, or data packets transmitted on a logical channel corresponding to the DRB may be configured by the base station, or may be predetermined by protocol.

Figure 3:
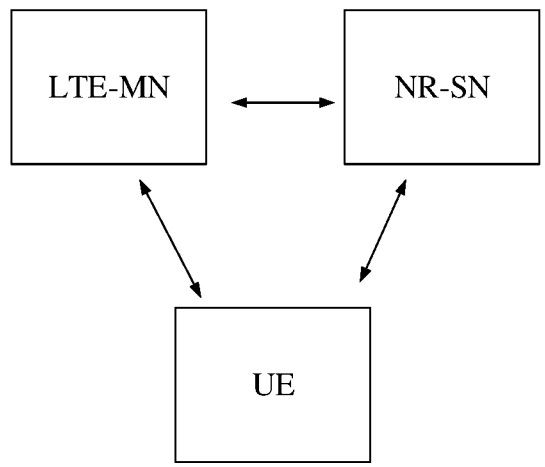
FIG. 3 is a schematic structural diagram of a dual connectivity (DC) system.

A brief description of split bearer is provided hereinafter. Currently, in 5G discussion, the implementation of tightly coupling an LTE system with a 5G system in a dual connectivity (DC) manner is discussed. One system acts as a master node (MN), while the other system acts as a secondary node (SN). Referring to FIG. 3, a schematic diagram of a DC system is illustrated. In the DC system, an LTE system is the MN, and an NR system is the SN. A DC system includes two cell groups, namely, a master cell group (MCG) and a secondary cell group (SCG). An MCG may include a primary cell (PCell) and one or more secondary cells (SCell). An SCG may include a primary secondary cell (PSCell) and one or more SCells.

In a DC system, DRB may transmit data on two nodes. For example, DRB1 may be transmitted on logical channel 1 of LTE and logical channel 2 of NR simultaneously. Such a bearer mode is called split bearer. In this instance, one DRB1 corresponds to two split bearers, and each split bearer corresponds to one logical channel. Of course, the quantity of logical channels corresponding to each split bearer may be more than one.

Of course, the LTE-NR DC is just one instance of DC. The DC may also include an NR-NR DC, an NR-LTE DC, and an NR-other radio access technology (RAT) DC, such as an NR-WIFI DC.

In addition, the split bearer is not limited to a DC system, but may be in a multi-connectivity system.

In the embodiments of the present disclosure, when the terminal is in a single connectivity system, the foregoing split bearer is not involved. In this case, the terminal may perform an integrity protection check on the data packets transmitted on the DRB or a logical channel corresponding to the DRB, and determine whether an integrity protection of the DRB fails based on a result of the integrity protection check.

In some embodiments of the present disclosure, optionally, the method of performing the integrity protection check on the data packets transmitted on the DRB, the split bearer corresponding to the DRB or the logical channel corresponding to the DRB, and determining whether the integrity protection of the DRB fails based on the result of the integrity protection check may include the following cases.

1) Performing the integrity protection check on data packets transmitted on the DRB, and determining whether the integrity protection of the DRB fails based on a result of the integrity protection check performed on the data packets transmitted on the DRB.

In specific, it may be determined that the integrity protection of the DRB fails when it is detected that the integrity protection of data packets transmitted on the DRB fails.

2) Performing the integrity protection check on data packets transmitted on a logical channel of at least two logical channels corresponding to the DRB, and determining whether the integrity protection of the DRB fails based on a result of the integrity protection check performed on the data packets transmitted on the logical channel. The terminal may arbitrarily or randomly select a logical channel to perform check; or a logical channel may be predefined to perform check.

In specific, it may be determined that the integrity protection of the DRB fails when it is detected that the integrity protection of data packets transmitted on the logical channel fails.

3) Performing the integrity protection check on data packets transmitted on a plurality of logical channels corresponding to the DRB, and determining whether the integrity protection of the DRB fails based on a result of the integrity protection check performed on the data packets transmitted on the plurality of logical channels.

The plurality of logical channels may be all logical channels corresponding to the DRB, or some of logical channels corresponding to the DRB.

In specific, it may be determined that the integrity protection of the DRB fails when it is detected that the integrity protection of data packets transmitted on each of the plurality of logical channels fails. Or, it is determined that the integrity protection of the DRB fails when it is detected that the integrity protection of data packets transmitted on more than a preset quantity of logical channels among the plurality of logical channels fails.

4) Performing the integrity protection check on data packets transmitted on a split bearer of at least two split bearers corresponding to the DRB, and determining whether the integrity protection of the DRB fails based on a result of the integrity protection check performed on the data packets transmitted on the split bearer.

The terminal may select arbitrarily or randomly a split bearer for the integrity protection check, or the split bearer used in the integrity protection check may be predefined.

In specific, it may be determined that the integrity protection of the DRB fails when it is detected that the integrity protection of data packets transmitted on the split bearer fails.

5) Performing the integrity protection check on data packets transmitted on a plurality of split bearers corresponding to the DRB, and determining whether the integrity protection of the DRB fails based on a result of the integrity protection check performed on the data packets transmitted on the plurality of split bearers.

The plurality of split bearers may be all split bearers corresponding to the DRB, or some of split bearers corresponding to the DRB.

In specific, it may be determined that the integrity protection of the DRB fails when it is detected that the integrity protection of data packets transmitted on each of the plurality of split bearers fails. Or, it is determined that the integrity protection of the DRB fails when it is detected that the integrity protection of data packets transmitted on more than a preset quantity of split bearers among the plurality of split bearers fails.

The foregoing 1) to 3) are applicable to a single connectivity system, and the foregoing 1) to 5) are applicable to a DC or multi-connectivity system.

A specific implementation of, the performing the integrity protection check on the data packets transmitted on the DRB, the split bearer corresponding to the DRB or the logical channel corresponding to the DRB and determining whether the integrity protection of the DRB fails based on the result of the integrity protection check, may be configured by a base station or predetermined by protocol.

In some embodiments of the present disclosure, the method of determining whether the integrity protection of the DRB fails based on the result of the integrity protection check may include the following cases.

1) Determining that the integrity protection of the DRB fails when it is detected that integrity protection of N data packets transmitted on the DRB, the split bearer corresponding to the DRB or the logical channel corresponding to the DRB fails, where N is a positive integer greater than or equal to 1; or 2) Determining that the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2; or 3) Determining that the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or 4) Determining that the integrity protection of the DRB fails when it is detected that integrity protection of a preset proportion of data packets transmitted on the DRB, the split bearer corresponding to the DRB or the logical channel corresponding to the DRB within a preset duration fails.

A specific implementation of, the determining whether the integrity protection of the DRB fails based on the result of the integrity protection check, may be configured by a base station or predetermined by protocol.

Figure 4:
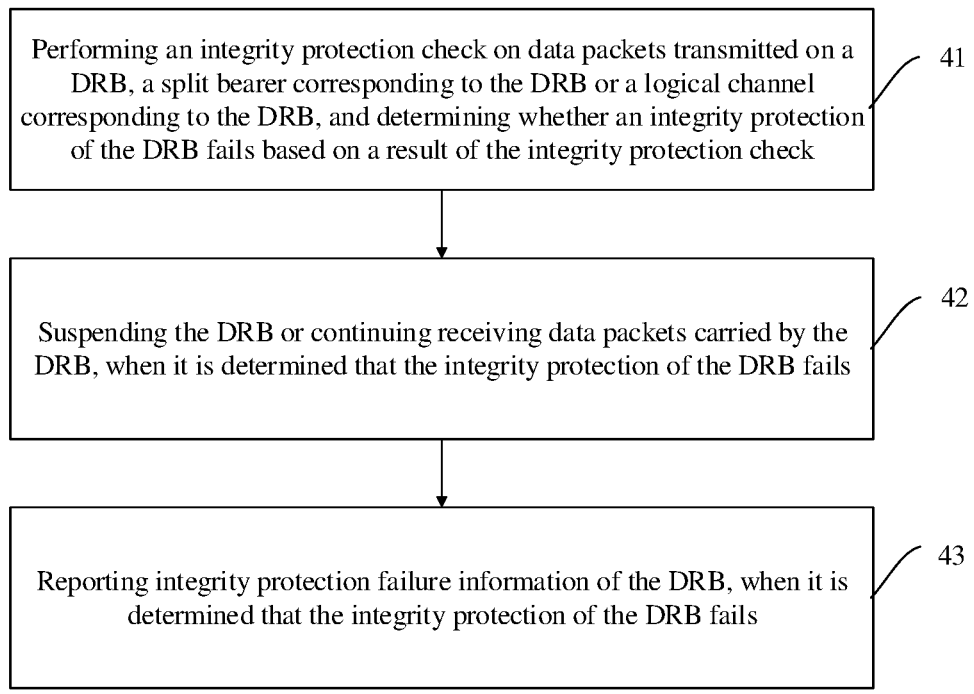
FIG. 4 is a schematic flow diagram of an integrity protection method according to a second embodiment of the present disclosure.

Referring to FIG. 4, a schematic flow diagram of an integrity protection method according to a second embodiment of the present disclosure is illustrated. The integrity protection method is applied to a terminal and includes step 41 to step 43.

The step 41 includes: performing an integrity protection check on data packets transmitted on a DRB, a split bearer corresponding to the DRB or a logical channel corresponding to the DRB, and determining whether an integrity protection of the DRB fails based on a result of the integrity protection check.

The step 42 includes: suspending the DRB or continuing receiving data packets carried by the DRB, when it is determined that the integrity protection of the DRB fails.

The step 43 includes: reporting integrity protection failure information of the DRB, when it is determined that the integrity protection of the DRB fails.

It should be noted that, the terms of step 42 and step 43 do not represent an execution order of steps. In some embodiments of the present disclosure, either of the step 42 and the step 43 may be executed first. Or, the step 42 and the step 43 may be executed simultaneously.

In the embodiments of the present disclosure, the terminal reports integrity protection failure information of the DRB to the base station when it is determined that the integrity protection of the DRB fails, so that the base station may be aware of the result of the integrity protection check of the DRB and perform operation accordingly.

In some embodiments of the present disclosure, optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

In specific, when the integrity protection check of the DRB is based on the data packets transmitted on the DRB, the integrity protection failure information may include only the identifier of the DRB. Of course, a situation where the integrity protection failure information also includes at least one of an identifier of a logical channel corresponding to the DRB or an identifier of a split bearer corresponding to the DRB is not excluded.

When the integrity protection check of the DRB is based on the data packets transmitted on the logical channel corresponding to the DRB, the integrity protection failure information may include at least one of the identifier of the DRB or the identifier of a logical channel on which the determination that the integrity protection of the DRB fails is based, i.e., the integrity protection failure information carries an identifier of a logical channel on which an integrity protection failure is detected.

When the integrity protection check of the DRB is based on the data packets transmitted on the split bearer corresponding to the DRB, the integrity protection failure information may include at least one of the identifier of the DRB, the identifier of a split bearer on which the determination that the integrity protection of the DRB fails is based, or an identifier of a logical channel corresponding to the split bearer on which the determination that the integrity protection of the DRB fails is based.

In some embodiments of the present disclosure, the DRB may be suspended when it is determined that the integrity protection of the DRB fails. The suspending the DRB may include the following two modes.

1) Suspending reception of data packets of the DRB, a split bearer on which the determination that the integrity protection of the DRB fails is based, or a logical channel on which the determination that the integrity protection of the DRB fails is based.

In other words, reception of data carried by the entire DRB may be suspended, or reception of data carried by a certain one or more split bearers or logical channels may be suspended.

2) Suspending a timer corresponding to the DRB, the split bearer on which the determination that the integrity protection of the DRB fails is based, or the logical channel on which the determination that the integrity protection of the DRB fails is based, on at least one of a radio link control (RLC) layer, a packet data convergence protocol (PDCP) layer, a media access control (MAC) layer or a service data adaptation protocol (SDAP) layer.

For example, the timer is an ordering timer of the PDCP layer, a t-Reassembly timer of the RLC layer, or a discontinuous reception (DRX) related timer of the MAC layer.

In some embodiments of the present disclosure, data packets carried by the DRB may be continued being received when it is determined that the integrity protection of the DRB fails. During the process of continuing receiving data packets carried by the DRB, when the terminal detects a data packet for which the integrity protection check fails, the data packet may be discarded.

Further, when continuing receiving data packets carried by the DRB, the terminal may report the integrity protection failure information of the DRB. After the integrity protection failure information of the DRB is reported, the integrity protection method may further include: starting a timer, where integrity protection failure information of the DRB is not reported before the timer expires.

For example, when the terminal detects that the integrity protection of 5 consecutive PDCP PDUs transmitted on the DRB fails, the terminal reports the integrity protection failure information of the DRB to the base station. In addition, the terminal continues receiving data packets carried by the DRB and starts the timer. Before the timer expires, if the terminal detects again that the integrity protection of 5 consecutive PDCP PDUs transmitted on the DRB fails, the terminal only discards the PDCP PDUs for which the integrity protection check fails and does not report the integrity protection failure information of the DRB to the base station.

Or, in a case of continuing receiving data packets carried by the DRB when it is determined that the integrity protection of the DRB fails, after the reporting integrity protection failure information of the DRB, the integrity protection method may further include: starting a counter, and incrementing a count value of the counter each time integrity protection failure information of the DRB is reported, where integrity protection failure information of the DRB is not reported any longer in a case that the count value of the counter reaches a preset threshold.

The counter may be incremented by one or other numerical values each time integrity protection failure information of the DRB is reported.

Therefore, the terminal is prevented from frequently reporting the integrity protection failure information of the DRB in case that the integrity protection of the DRB is determined to be a failure and the data packets carried by the DRB are continued being received.

Referring to FIG. 5, a schematic flow diagram of an integrity protection method according to a third embodiment of the present disclosure is disclosed. The integrity protection method is applied to a base station and includes following steps.

A step 51 includes: transmitting, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration.

In some embodiments of the present disclosure, the relevant configuration used by the terminal in performing an integrity protection check may be configured by a base station, such that the relevant configuration may be more flexible.

In some embodiments of the present disclosure, the relevant configuration is used by the terminal to perform the integrity protection check by performing the integrity protection check on data packets transmitted on the DRB, a split bearer corresponding to the DRB or a logical channel corresponding to the DRB, and determining whether the integrity protection of the DRB fails based on a result of the integrity protection check.

In another word, the terminal is configured to perform the integrity protection check based on data packets transmitted on the DRB, data packets transmitted on the split bearer corresponding to the DRB, or data packets transmitted on the logical channel corresponding to the DRB, so as to determine whether the integrity protection of the DRB fails based on a result of the integrity protection check.

In some embodiments of the present disclosure, the relevant configuration is used by the terminal to perform the integrity protection check in the following manner:

1) performing, by the terminal, the integrity protection check on data packets transmitted on the DRB, and determining whether the integrity protection of the DRB fails based on a result of the integrity protection check performed on the data packets transmitted on the DRB; or 2) performing, by the terminal, the integrity protection check on data packets transmitted on a split bearer of at least two split bearers corresponding to the DRB, and determining whether the integrity protection of the DRB fails based on a result of the integrity protection check performed on the data packets transmitted on the split bearer; or 3) performing, by the terminal, the integrity protection check on data packets transmitted on a plurality of split bearers corresponding to the DRB, and determining whether the integrity protection of the DRB fails based on a result of the integrity protection check performed on the data packets transmitted on the plurality of split bearers; or 4) performing, by the terminal, the integrity protection check on data packets transmitted on a logical channel of at least two logical channels corresponding to the DRB, and determining whether the integrity protection of the DRB fails based on a result of the integrity protection check performed on the data packets transmitted on the logical channel; or 5) performing, by the terminal, the integrity protection check on data packets transmitted on a plurality of logical channels corresponding to the DRB, and determining whether the integrity protection of the DRB fails based on a result of the integrity protection check performed on the data packets transmitted on the plurality of logical channels.

In some embodiments of the present disclosure, the relevant configuration is used by the terminal to perform the integrity protection check in the following manner:

1) determining, by the terminal, that the integrity protection of the DRB fails when it is detected that integrity protection of N data packets transmitted on the DRB, the split bearer corresponding to the DRB or the logical channel corresponding to the DRB fails, where N is a positive integer greater than or equal to 1; or 2) determining, by the terminal, that the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2; or 3) determining, by the terminal, that the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or 4) determining, by the terminal, that the integrity protection of the DRB fails when it is detected that integrity protection of a preset proportion of data packets transmitted on the DRB, the split bearer corresponding to the DRB or the logical channel corresponding to the DRB within a preset duration fails.

In some embodiments of the present disclosure, after the transmitting, to the terminal, the relevant configuration used in performing the integrity protection check on data packets transmitted on the DRB, the split bearer corresponding to the DRB or the logical channel corresponding to the DRB, the method further includes: receiving integrity protection failure information of the DRB reported by the terminal.

Optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

In some embodiments of the present disclosure, after the receiving the integrity protection failure information of the DRB reported by the terminal, the method further includes: informing the terminal to suspend the DRB or continue receiving data packets carried by the DRB.

In some embodiments of the present disclosure, the base station informs the terminal to suspend the DRB or continue receiving data packets carried by the DRB.

In some other embodiments of the present disclosure, the terminal may autonomously decide to suspend the DRB or continue receiving data packets carried by the DRB after it is determined that the integrity protection of the DRB fails.

Optionally, the suspending the DRB includes: suspending reception of data packets of the DRB, a split bearer on which the determination that the integrity protection of the DRB fails is based, or a logical channel on which the determination that the integrity protection of the DRB fails is based; or suspending a timer corresponding to the DRB, the split bearer on which the determination that the integrity protection of the DRB fails is based, or the logical channel on which the determination that the integrity protection of the DRB fails is based on at least one of a radio link control (RLC) layer, a packet data convergence protocol (PDCP) layer, a media access control (MAC) layer or a service data adaptation protocol (SDAP) layer.

In some embodiments of the present disclosure, if the terminal continues receiving data packets carried by the DRB after it is determined that the integrity protection of the DRB fails, the transmitting, to the terminal, the relevant configuration used in performing the integrity protection check on data packets transmitted on the DRB, the split bearer corresponding to the DRB or the logical channel corresponding to the DRB includes: configuring an expiry threshold of a timer for the terminal, wherein the terminal starts the timer after reporting the integrity protection failure information of the DRB, determines whether the timer expires by using the expiry threshold and does not report the integrity protection failure information of the DRB before the timer expires; or configuring a preset threshold of a counter for the terminal, wherein the terminal increments a count value of the counter each time integrity protection failure information of the DRB is reported, and does not report integrity protection failure information of the DRB any longer when the count value of the counter reaches the preset threshold.

Therefore, the terminal is prevented from frequently reporting the integrity protection failure information of the DRB in case that the integrity protection of the DRB is determined to be a failure and the data packets carried by the DRB are continued being received.

Based on the same creative concept, a terminal 60 is provided by a fourth embodiment of the present disclosure, referring to FIG. 6. The terminal 60 includes: a checking module 61, configured to perform an integrity protection check on data packets transmitted on a DRB, a split bearer corresponding to the DRB or a logical channel corresponding to the DRB, and determine whether an integrity protection of the DRB fails based on a result of the integrity protection check; and a processing module 62, configured to suspend the DRB or continue receiving data packets carried by the DRB, when it is determined that the integrity protection of the DRB fails.

In some embodiments of the present disclosure, a method in which the terminal may perform an integrity protection check by checking data packets transmitted on a DRB, a split bearer corresponding to the DRB or a logical channel corresponding to the DRB, and determine whether an integrity protection of the DRB fails based on a result of the integrity protection check is clearly specified; and, it is also specified that the terminal may suspend the DRB or continue receiving data packets carried by the DRB when it is determined that the integrity protection of the DRB fails.

In some embodiments of the present disclosure, the data packet is a packet data convergence protocol (PDCP) protocol data unit (PDU) or a PDCP service data unit (SDU).

In some embodiments of the present disclosure, optionally, that the checking module 61 performs an integrity protection check on data packets transmitted on a DRB, a split bearer corresponding to the DRB or a logical channel corresponding to the DRB, and determines whether an integrity protection of the DRB fails based on a result of the integrity protection check may include following cases.

In some embodiments of the present disclosure, the checking module 61 is configured to perform the integrity protection check on data packets transmitted on the DRB, and determine whether the integrity protection of the DRB fails based on a result of the integrity protection check performed on the data packets transmitted on the DRB.

In some embodiments of the present disclosure, the checking module 61 is configured to perform the integrity protection check on data packets transmitted on a split bearer of at least two split bearers corresponding to the DRB, and determine whether the integrity protection of the DRB fails based on a result of the integrity protection check performed on the data packets transmitted on the split bearer.

In some embodiments of the present disclosure, the checking module 61 is configured to perform the integrity protection check on data packets transmitted on a plurality of split bearers corresponding to the DRB, and determine whether the integrity protection of the DRB fails based on a result of the integrity protection check performed on the data packets transmitted on the plurality of split bearers.

In some embodiments of the present disclosure, the checking module 61 is configured to perform the integrity protection check on data packets transmitted on a logical channel of at least two logical channels corresponding to the DRB, and determine whether the integrity protection of the DRB fails based on a result of the integrity protection check performed on the data packets transmitted on the logical channel.

In some embodiments of the present disclosure, the checking module 61 is configured to perform the integrity protection check on data packets transmitted on a plurality of logical channels corresponding to the DRB, and determine whether the integrity protection of the DRB fails based on a result of the integrity protection check performed on the data packets transmitted on the plurality of logical channels.

In some embodiments of the present disclosure, that the checking module 61 determines whether an integrity protection of the DRB fails based on a result of the integrity protection check may include following cases.

In some embodiments of the present disclosure, the checking module 61 is configured to determine the integrity protection of the DRB fails when it is detected that integrity protection of N data packets transmitted on the DRB, the split bearer corresponding to the DRB or the logical channel corresponding to the DRB fails, where N is a positive integer greater than or equal to 1.

In some embodiments of the present disclosure, the checking module 61 is configured to determine the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2.

In some embodiments of the present disclosure, the checking module 61 is configured to determine the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N.

In some embodiments of the present disclosure, the checking module 61 is configured to determine the integrity protection of the DRB fails when it is detected that integrity protection of a preset proportion of data packets transmitted on the DRB, the split bearer corresponding to the DRB or the logical channel corresponding to the DRB within a preset duration fails.

Referring to FIG. 7, a terminal 70 is further provided by a fifth embodiment of the present disclosure. The terminal 70 includes: a checking module 61, configured to perform an integrity protection check on data packets transmitted on a DRB, a split bearer corresponding to the DRB or a logical channel corresponding to the DRB, and determine whether an integrity protection of the DRB fails based on a result of the integrity protection check; a processing module 62, configured to suspend the DRB or continue receiving data packets carried by the DRB, when it is determined that the integrity protection of the DRB fails; and a reporting module 63, configured to report integrity protection failure information of the DRB, when it is determined that the integrity protection of the DRB fails.

In some embodiments of the present disclosure, the terminal reports integrity protection failure information of the DRB to the base station when it is determined that the integrity protection of the DRB fails, so that the base station may be aware of the result of the integrity protection check of the DRB and perform operation accordingly.

Optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

In some embodiments of the present disclosure, the processing module 62 is configured to suspend reception of data packets of the DRB, a split bearer on which the determination that the integrity protection of the DRB fails is based, or a logical channel on which the determination that the integrity protection of the DRB fails is based; or the processing module 62 is configured to suspend a timer corresponding to the DRB, the split bearer on which the determination that the integrity protection of the DRB fails is based, or the logical channel on which the determination that the integrity protection of the DRB fails is based on at least one of a radio link control (RLC) layer, a packet data convergence protocol (PDCP) layer, a media access control (MAC) layer or a service data adaptation protocol (SDAP) layer.

In some embodiments of the present disclosure, the processing module is configured to continue receiving data packets carried by the DRB when it is determined that the integrity protection of the DRB fails.

The terminal further includes: a first starting module, configured to start a timer after the reporting module reports the integrity protection failure information of the DRB, and not report integrity protection failure information of the DRB before the timer expires; or a second starting module, configured to start a counter after the reporting module reports the integrity protection failure information of the DRB, increment a count value of the counter each time integrity protection failure information of the DRB is reported, and not report integrity protection failure information of the DRB any longer when the count value of the counter reaches a preset threshold.

Therefore, the terminal is prevented from frequently reporting the integrity protection failure information of the DRB, in case that the integrity protection of the DRB is determined to be a failure, the data packets carried by the DRB are continued being received and the integrity protection failure information of the DRB is reported.

The terminal in some embodiments of the present disclosure may be a wireless terminal or a wired terminal. The wireless terminal may refer to a device that provides voice and/or other service data connectivity to the user, a handheld device having a wireless connecting function, or other processing device connected to a wireless modem. The wireless terminal may communicate with one or more core networks via a radio access network (RAN), and the wireless terminal may be a mobile terminal, such as a mobile phone (or referred to as "cellular" phone) and a computer having a mobile terminal, for example, a portable, pocket-sized, handheld, computer built-in or in-vehicle mobile device that exchanges voice and/or data with the radio access network. For example, it may be a personal communication service (PCS) telephone, cordless telephone, session initiation protocol (SIP) telephone, wireless local loop (WLL) station, personal digital assistant (PDA) or the like. The wireless terminal may also be referred to as a system, a subscriber unit, a subscriber station, a mobile station, a mobile, a remote station, a remote terminal, an access terminal, a user terminal, a user agent, a user device or user equipment, and is not limited herein.

Figure 8:
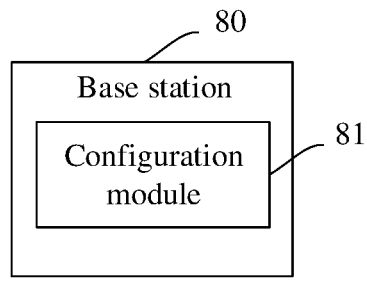
FIG. 8 is a schematic structural diagram of a base station according to a sixth embodiment of the present disclosure.

Referring to FIG. 8, a base station 80 is further provided by a sixth embodiment of the present disclosure. The base station 80 includes: a configuration module 81, configured to transmit, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration.

In some embodiments of the present disclosure, the relevant configuration used by the terminal in performing an integrity protection check may be configured by a base station, such that the relevant configuration may be more flexible.

In some embodiments of the present disclosure, the relevant configuration transmitted by the configuration module 81 is used by the terminal to perform the integrity protection check by performing the integrity protection check on data packets transmitted on the DRB, a split bearer corresponding to the DRB or a logical channel corresponding to the DRB, and determining whether the integrity protection of the DRB fails based on a result of the integrity protection check.

In another word, the terminal is configured to perform the integrity protection check specifically based on data packets transmitted on the DRB, data packets transmitted on the split bearer corresponding to the DRB, or data packets transmitted on the logical channel corresponding to the DRB.

In some embodiments of the present disclosure, the relevant configuration transmitted by the configuration module 81 is used by the terminal to perform the integrity protection check in the following manner:

performing, by the terminal, the integrity protection check on data packets transmitted on a split bearer of at least two split bearers corresponding to the DRB, and determining whether the integrity protection of the DRB fails based on a result of the integrity protection check performed on the data packets transmitted on the split bearer; or performing, by the terminal, the integrity protection check on data packets transmitted on a plurality of split bearers corresponding to the DRB, and determining whether the integrity protection of the DRB fails based on a result of the integrity protection check performed on the data packets transmitted on the plurality of split bearers; or performing, by the terminal, the integrity protection check on data packets transmitted on a logical channel of at least two logical channels corresponding to the DRB, and determining whether the integrity protection of the DRB fails based on a result of the integrity protection check performed on the data packets transmitted on the logical channel; or performing, by the terminal, the integrity protection check on data packets transmitted on a plurality of logical channels corresponding to the DRB, and determining whether the integrity protection of the DRB fails based on a result of the integrity protection check performed on the data packets transmitted on the plurality of logical channels.

In some embodiments of the present disclosure, the relevant configuration transmitted by the configuration module 81 is used by the terminal to perform the integrity protection check in the following manner:

determining, by the terminal, that the integrity protection of the DRB fails when it is detected that integrity protection of N data packets transmitted on the DRB, the split bearer corresponding to the DRB or the logical channel corresponding to the DRB fails, where N is a positive integer greater than or equal to 1; or determining, by the terminal, that the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2; or determining, by the terminal, that the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or determining, by the terminal, that the integrity protection of the DRB fails when it is detected that integrity protection of a preset proportion of data packets transmitted on the DRB, the split bearer corresponding to the DRB or the logical channel corresponding to the DRB within a preset duration fails.

Figure 9:
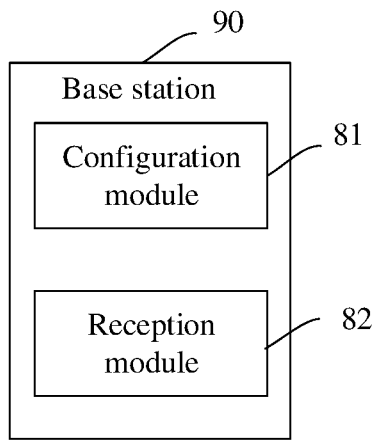
FIG. 9 is a schematic structural diagram of a base station according to a seventh embodiment of the present disclosure.

Referring to FIG. 9, a base station 90 is further provided by a seventh embodiment of the present disclosure. The base station 90 includes: a configuration module 81, configured to transmit, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration; a reception module 82, configured to receive integrity protection failure information of the DRB reported by the terminal.

Optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

Since the base station receives the integrity protection failure information reported by the terminal, the base station may process the DRB data accordingly based on the integrity protection failure information reported by the terminal.

Figure 10:
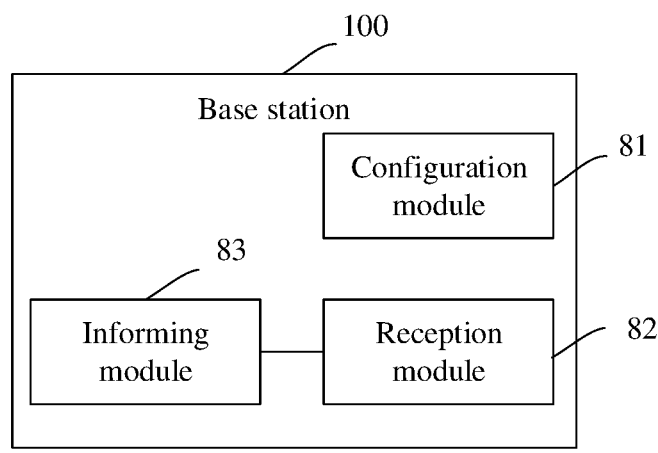
FIG. 10 is a schematic structural diagram of a base station according to an eighth embodiment of the present disclosure.

Referring to FIG. 10, a base station 100 is further provided by an eighth embodiment of the present disclosure. The base station 100 includes: a configuration module 81, configured to transmit, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration; a reception module 82, configured to receive integrity protection failure information of the DRB reported by the terminal; an informing module 83, configured to inform the terminal to suspend the DRB or continue receiving data packets carried by the DRB.

In some embodiments of the present disclosure, having received the integrity protection failure information of the DRB reported by the terminal, the base station informs the terminal to process the DRB data accordingly.

In some embodiments of the present disclosure, suspending, by the terminal, the DRB includes: suspending reception of data packets of the DRB, a split bearer on which the determination that the integrity protection of the DRB fails is based, or a logical channel on which the determination that the integrity protection of the DRB fails is based; or suspending a timer corresponding to the DRB, the split bearer on which the determination that the integrity protection of the DRB fails is based, or the logical channel on which the determination that the integrity protection of the DRB fails is based on at least one of a radio link control (RLC) layer, a packet data convergence protocol (PDCP) layer, a media access control (MAC) layer or a service data adaptation protocol (SDAP) layer.

In some embodiments of the present disclosure, in an embodiment where the terminal continues receiving data packets carried by the DRB when it is determined that the integrity protection of the DRB fails, the configuration module 81 is configured to configure an expiry threshold of a timer for the terminal, wherein the terminal starts the timer after reporting the integrity protection failure information of the DRB, determines whether the timer expires by using the expiry threshold and does not report the integrity protection failure information of the DRB before the timer expires; or the configuration module 81 is configured to configure a preset threshold of a counter for the terminal, wherein the terminal increments a count value of the counter each time integrity protection failure information of the DRB is reported, and does not report integrity protection failure information of the DRB any longer when the count value of the counter reaches the preset threshold.

The base station in some embodiments of the present disclosure may be a base transceiver station (BTS) in the global system of mobile communication (GSM) or the code division multiple access (CDMA), a NodeB (NB) in the wideband code division multiple access (WCDMA), an evolutional Node B (eNB or eNodeB) in LTE, a relay station or an access point, or a base station in future 5G network, or the like, which is not limited herein.

Figure 11:
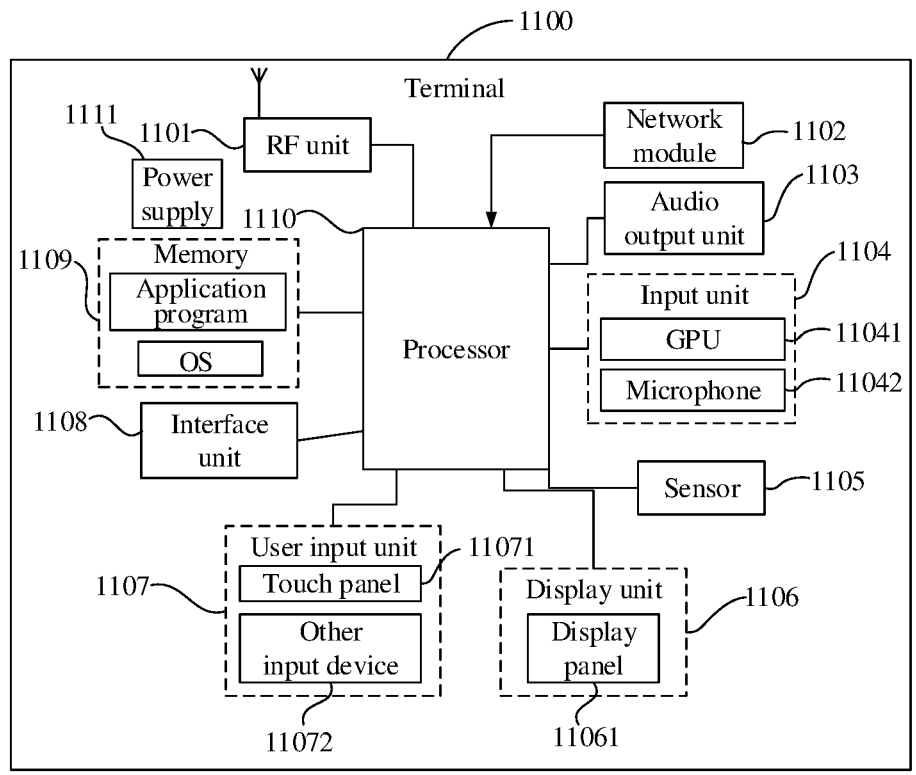
FIG. 11 is a schematic hardware structure diagram of a terminal according to a ninth embodiment of the present disclosure.

FIG. 11 is a schematic hardware structure diagram of a terminal according to a ninth embodiment of the present disclosure. The terminal 1100 includes, but is not limited to: a radio frequency (RF) unit 1101, a network module 1102, an audio output unit 1103, an input unit 1104, a sensor 1105, a display unit 1106, a user input unit 1107, an interface unit 1108, a memory 1109, a processor 1110, a power supply 1111, etc. It is appreciated by a person skill in the art, the mobile terminal structure as shown in FIG. 11 constitutes no limitation of the mobile terminal. The mobile terminal may include more or less components than those shown, or some components may be combined or the mobile terminal may have different component arrangements. In some embodiments of the present disclosure, the mobile terminal includes, but is not limited to: a mobile phone, a tablet computer, a laptop computer, a palm computer, an in-vehicle terminal, a wearable device, a pedometer and the like.

The processor 1110 is configured to perform an integrity protection check on data packets transmitted on a DRB, a split bearer corresponding to the DRB or a logical channel corresponding to the DRB, and determine whether an integrity protection of the DRB fails based on a result of the integrity protection check; suspend the DRB or continue receiving data packets carried by the DRB, when it is determined that the integrity protection of the DRB fails.

In some embodiments of the present disclosure, a method in which the terminal may perform an integrity protection check by checking data packets transmitted on a DRB, a split bearer corresponding to the DRB or a logical channel corresponding to the DRB, and determine whether an integrity protection of the DRB fails based on a result of the integrity protection check is clearly specified; and, it is also specified that the terminal may suspend the DRB or continue receiving data packets carried by the DRB when it is determined that the integrity protection of the DRB fails.

It is understood, in some embodiments of the present disclosure, the RF unit 1101 may be configured to receive and transmit signals during information transmission or during a call. Specifically, the RF unit 1101 receives downlink data from a base station and transfers the data to the processor 1110 for processing; and the RF unit 1101 transmits uplink data to the base station. Generally, the RF unit 1101 includes, but is not limited to: an antenna, at least one amplifier, a transceiver, a coupler, a low noise amplifier, a duplexer and the like. In addition, the RF unit 1101 may be configured to communicate with a network or other device through a wireless communication system.

By means of the network module 1102, the mobile terminal provides user with wireless broadband Internet access, such as sending and receiving emails, browsing webpages and accessing streamed media.

The audio output unit 1103 may convert audio data received by the RF unit 1101 or network module 1102 or stored in the memory 1109 into audio signals and output audibly. Moreover, the audio output unit 1103 may provide audio outputs associated with the specific functions performed by the mobile terminal 1100 (such as, incoming call ringtone, message received ringtone). The audio output unit 1103 includes a speaker, a buzzer, a telephone receiver and the like.

The input unit 1104 is configured to receive audio or video signals. The input unit 1104 may include a graphics processing unit (GPU) 11041 and a microphone 11042. The GPU 11041 processes image data such as still picture or video acquired by an image capture device (e.g., a camera) in a video capture mode or image capture mode. The processed image frames may be displayed on the display unit 1106. The image frames processed by the GPU 11041 may be stored in the memory 1109 (or other storage medium) or sent via the RF unit 1101 or network module 1102. The microphone 11042 may pick up sound and convert it into audio data. In a phone call mode, the processed audio data may be converted into a format suitable for transmission to a mobile communication base station via the RF unit 1101 and output.

The mobile terminal 1100 further includes at least one sensor 1105, for example, an optical sensor, a motion sensor, among others. In specific, the optical sensor includes ambient light sensor and proximity sensor. The ambient light sensor may adjust a brightness of a display panel 11061 according to the ambient light conditions. The proximity sensor may deactivate the display panel 11061 and/or a backlight when the mobile terminal 1100 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the mobile terminal (e.g., switch between portrait and landscape modes, related games, magnetometer posture calibration), vibration identification related function (e.g., pedometer, knock) and the like; the sensor 1105 may further include a fingerprint sensor, a pressure sensor, an iris sensor, a molecule sensor, a gyroscope, a barometer, a hygrometer, a thermometer, an infrared sensor and the like, which is not described in detail herein.

The display unit 1106 is configured to display information input by or presented to a user. The display unit 1106 may include a display panel 11061. The display panel 11061 may be constructed in form of liquid crystal display (LCD), organic light-emitting diode (OLED) and the like.

The user input unit 1107 may be configured to receive input numerical information or character information, and generate key signal inputs related to the user setting and function control of the mobile terminal. In specific, the user input unit 1107 includes a touch panel 11071 and other input devices 11072. The touch panel 11071, also known as touch screen, may detect the touches thereon or in the vicinity thereof performed by the user (such as touch operations performed on or in the vicinity of the touch panel 11071 by the user using a finger, stylus or any other suitable object or accessory). The touch panel 11071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 1110, as well as receives and executes the commands from the processor 1110. Further, the touch panel 11071 may be implemented in a variety of modes, such as resistance, capacitance, infrared and surface acoustic wave. In addition to the touch panel 11071, the user input unit 1107 may include other input devices 11072. In specific, the other input devices 11072 may include, but is not limited to: physical keyboard, functional keys (such as volume button, switch button, etc.), track ball, mouse, joystick, which is not described in detail herein.

Further, the touch panel 11071 may overlie the display panel 11061. Having detected a touch operation thereon or in the vicinity thereof, the touch panel 11071 conveys the detected touch signal to the processor 1110 to categorize the touch event, and the processor 1110 provides corresponding visual output on the display panel 11061 in accordance with the category of the touch event. Although, in FIG. 11, the touch panel 11071 and the display panel 11061 are provided as two separate parts to implement the input and output function of the mobile terminal, the touch panel 11071 and the display panel 11061 may be integrated to implement the input and output function of the mobile terminal in some embodiments, which is not limited herein.

The interface unit 1108 is an interface by which an external device is connected to the mobile terminal 1100. For example, the external device may include a wired or wireless headset port, an external power supply (or battery charger) port, a wired or wireless data port, a storage card port, a port configured to be connected to a device having an identification module, an audio input/output (I/O) port, a video I/O port, an earphone port and the like. The interface unit 1108 may be configured to receive input (e.g., data information, power, etc.) from the external device and transfer the received input to one or more components in the mobile terminal 1100, or may be configured to transmit data between the mobile terminal 1100 and the external device.

The memory 1109 may be configured to store software program and other data. The memory 1109 may include generally a program storage area and a data storage area. The program storage area may store an operating system (OS), an application program required for at least one function (such as an audio playing function and an image playback function) and the like; the data storage area may store data (e.g., audio data, phone book, etc.) created according to usage of a mobile phone, and the like. Moreover, the memory 1109 may include a cache, as well as a non-volatile memory, such as at least one disk storage device, flash memory or other non-volatile solid-state storage devices.

The processor 1110 is a control center of the mobile terminal. The processor 1110 is connected to various parts of the entire mobile terminal through various interfaces and lines, and performs various functions of the mobile terminal and processes data by executing or running software programs and/or modules stored in the memory 1109 and invoking data stored in the memory 1109, so as to achieve an overall monitoring of the mobile terminal. The processor 1110 may include one or more processing units; optionally, the processor 1110 may integrate an application processor and a modem, wherein the application processor is mainly responsible for executing an operating system, a user interface, an application program, etc., while the modem is mainly responsible for handling wireless communication. It is understood, the modem may be not integrated in the processor 1110.

The mobile terminal 1100 may further include a power supply 1111 (e.g., a battery) providing power to various components. Optionally, the power supply 1111 may be logically connected to the processor 1110 via a power management system, such that functions such as charging management, discharging management and power management may be achieved through the power management system.

Further, the mobile terminal 1100 includes some function modules not shown, which are not described in detail herein.

Optionally, the processor 1110 is further configured to report integrity protection failure information of the DRB, when it is determined that the integrity protection of the DRB fails.

Optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

Optionally, the processor 1110 is further configured to perform the integrity protection check on data packets transmitted on the DRB, and determine whether the integrity protection of the DRB fails based on a result of the integrity protection check performed on the data packets transmitted on the DRB; or the processor 1110 is further configured to perform the integrity protection check on data packets transmitted on a split bearer of at least two split bearers corresponding to the DRB, and determine whether the integrity protection of the DRB fails based on a result of the integrity protection check performed on the data packets transmitted on the split bearer; or the processor 1110 is further configured to perform the integrity protection check on data packets transmitted on a plurality of split bearers corresponding to the DRB, and determine whether the integrity protection of the DRB fails based on a result of the integrity protection check performed on the data packets transmitted on the plurality of split bearers; or the processor 1110 is further configured to perform the integrity protection check on data packets transmitted on a logical channel of at least two logical channels corresponding to the DRB, and determine whether the integrity protection of the DRB fails based on a result of the integrity protection check performed on the data packets transmitted on the logical channel; or the processor 1110 is further configured to perform the integrity protection check on data packets transmitted on a plurality of logical channels corresponding to the DRB, and determine whether the integrity protection of the DRB fails based on a result of the integrity protection check performed on the data packets transmitted on the plurality of logical channels.

Optionally, the processor 1110 is further configured to determine the integrity protection of the DRB fails when it is detected that integrity protection of N data packets transmitted on the DRB, the split bearer corresponding to the DRB or the logical channel corresponding to the DRB fails, where N is a positive integer greater than or equal to 1; or the processor 1110 is further configured to determine the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2; or the processor 1110 is further configured to determine the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or the processor 1110 is further configured to determine the integrity protection of the DRB fails when it is detected that integrity protection of a preset proportion of data packets transmitted on the DRB, the split bearer corresponding to the DRB or the logical channel corresponding to the DRB within a preset duration fails.

Optionally, the processor 1110 is further configured to suspend reception of data packets of the DRB, a split bearer on which the determination that the integrity protection of the DRB fails is based, or a logical channel on which the determination that the integrity protection of the DRB fails is based; or the processor 1110 is further configured to suspend a timer corresponding to the DRB, the split bearer on which the determination that the integrity protection of the DRB fails is based, or the logical channel on which the determination that the integrity protection of the DRB fails is based on at least one of a radio link control (RLC) layer, a packet data convergence protocol (PDCP) layer, a media access control (MAC) layer or a service data adaptation protocol (SDAP) layer.

Optionally, the processor 1110 is further configured to start a timer, where integrity protection failure information of the DRB is not reported before the timer expires; or the processor 1110 is further configured to start a counter, and increment a count value of the counter each time integrity protection failure information of the DRB is reported, where integrity protection failure information of the DRB is not reported any longer when the count value of the counter reaches a preset threshold.

Optionally, the data packet is a packet data convergence protocol (PDCP) protocol data unit (PDU) or a PDCP service data unit (SDU).

Figure 12:
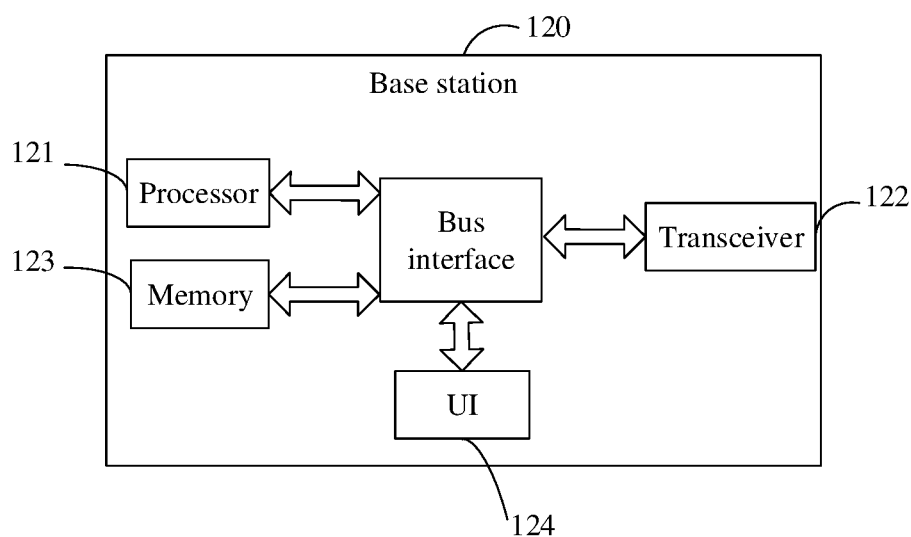
FIG. 12 is a schematic structural diagram of a base station according to a tenth embodiment of the present disclosure.

Referring to FIG. 12, a schematic structural diagram of a base station according to a tenth embodiment of the present disclosure is illustrated. The base station 120 includes: a processor 121, a transceiver 122, a memory 123, a user interface (UI) 124, and a bus interface.

In some embodiments of the present disclosure, the base station 120 further includes a computer program stored in the memory 123 and executable by the processor 121. The processor 121 is configured to execute the computer program to implement following step: transmitting, to a terminal, relevant configuration used in performing an integrity protection check on data packets transmitted on a DRB, a split bearer corresponding to the DRB or a logical channel corresponding to the DRB, wherein the terminal determines whether an integrity protection of the DRB fails based on the relevant configuration.

In FIG. 12, the bus architecture may include any quantity of interconnected buses and bridges, and various circuits such as one or more processors represented by the processor 121 and memory represented by the memory 123 are connected to each other. The bus architecture may connect a variety of other circuits such as peripherals, voltage regulators and power management circuits to each other, which is well known in the art, thus no further description thereof will be given herein. The bus interface provides an interface. The transceiver 122 may include multiple components, i.e. transmitter and receiver, which are used for communicating with other devices via a transmission medium. For various user equipment, the UI 124 may also be an interface capable of connecting externally or internally to a required device, and the device which may be connected includes, but is not limited to: keypad, display, speaker, microphone, joystick and the like.

The processor 121 is responsible for supervising the bus architecture and normal operation and the memory 123 may store the data being used by the processor 121 during operation.

Optionally, the relevant configuration is used by the terminal to perform the integrity protection check in the following manner: performing, by the terminal, the integrity protection check on data packets transmitted on the DRB, and determining whether the integrity protection of the DRB fails based on a result of the integrity protection check performed on the data packets transmitted on the DRB; or performing, by the terminal, the integrity protection check on data packets transmitted on a split bearer of at least two split bearers corresponding to the DRB, and determining whether the integrity protection of the DRB fails based on a result of the integrity protection check performed on the data packets transmitted on the split bearer; or performing, by the terminal, the integrity protection check on data packets transmitted on a plurality of split bearers corresponding to the DRB, and determining whether the integrity protection of the DRB fails based on a result of the integrity protection check performed on the data packets transmitted on the plurality of split bearers; or performing, by the terminal, the integrity protection check on data packets transmitted on a logical channel of at least two logical channels corresponding to the DRB, and determining whether the integrity protection of the DRB fails based on a result of the integrity protection check performed on the data packets transmitted on the logical channel; or performing, by the terminal, the integrity protection check on data packets transmitted on a plurality of logical channels corresponding to the DRB, and determining whether the integrity protection of the DRB fails based on a result of the integrity protection check performed on the data packets transmitted on the plurality of logical channels.

Optionally, the relevant configuration is used by the terminal to perform the integrity protection check in the following manner: determining, by the terminal, that the integrity protection of the DRB fails when it is detected that integrity protection of N data packets transmitted on the DRB, the split bearer corresponding to the DRB or the logical channel corresponding to the DRB fails, where N is a positive integer greater than or equal to 1; or determining, by the terminal, that the integrity protection of the DRB fails when it is detected that integrity protection of N consecutive data packets transmitted on the DRB, the split bearer corresponding to the DRB or the logical channel corresponding to the DRB fails, where N is a positive integer greater than or equal to 2; or determining, by the terminal, that the integrity protection of the DRB fails when it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or determining, by the terminal, that the integrity protection of the DRB fails when it is detected that integrity protection of a preset proportion of data packets transmitted on the DRB, the split bearer corresponding to the DRB or the logical channel corresponding to the DRB within a preset duration fails.

Optionally, the processor 121 is further configured to execute the computer program to implement following step: receiving integrity protection failure information of the DRB reported by the terminal.

Optionally, the integrity protection failure information includes at least one of: an identifier of the DRB, an identifier of a split bearer on which the determination that the integrity protection of the DRB fails is based, or an identifier of a logical channel on which the determination that the integrity protection of the DRB fails is based.

Optionally, the processor 121 is further configured to execute the computer program to implement following step: after receiving the integrity protection failure information of the DRB reported by the terminal, informing the terminal to suspend the DRB or continue receiving data packets carried by the DRB.

Optionally, the suspending the DRB includes: suspending reception of data packets of the DRB, a split bearer on which the determination that the integrity protection of the DRB fails is based, or a logical channel on which the determination that the integrity protection of the DRB fails is based; or suspending a timer corresponding to the DRB, the split bearer on which the determination that the integrity protection of the DRB fails is based, or the logical channel on which the determination that the integrity protection of the DRB fails is based on at least one of a radio link control (RLC) layer, a packet data convergence protocol (PDCP) layer, a media access control (MAC) layer or a service data adaptation protocol (SDAP) layer.

Optionally, the processor 121 is further configured to execute the computer program to implement following step: configuring an expiry threshold of a timer for the terminal, wherein the terminal starts the timer after reporting the integrity protection failure information of the DRB, determines whether the timer expires by using the expiry threshold and does not report the integrity protection failure information of the DRB before the timer expires; or configuring a preset threshold of a counter for the terminal, wherein the terminal increments a count value of the counter each time integrity protection failure information of the DRB is reported, and does not report integrity protection failure information of the DRB any longer when the count value of the counter reaches the preset threshold.

The base station according to some embodiments of the present disclosure configures for the terminal the relevant configuration used in performing an integrity protection check, such that the relevant configuration may be more flexible.

The present disclosure further provides in some embodiments a terminal, including: a processor, a memory and a computer program stored in the memory and executable by the processor, wherein the processor is configured to execute the computer program, to implement steps of the integrity protection method applied to a terminal in any one of foregoing embodiments.

The present disclosure further provides in some embodiments a base station, including: a processor, a memory and a computer program stored in the memory and executable by the processor, wherein the processor is configured to execute the computer program, to implement steps of the integrity protection method applied to a base station in any one of foregoing embodiments.

The present disclosure further provides in some embodiments a computer readable storage medium storing therein a computer program, wherein the computer program is configured to be executed by a processor, to implement steps of the integrity protection method applied to a terminal in any one of foregoing embodiments.

The present disclosure further provides in some embodiments a computer readable storage medium storing therein a computer program, wherein the computer program is configured to be executed by a processor, to implement steps of the integrity protection method applied to a base station in any one of foregoing embodiments.

The computer readable storage medium includes, for example, a read-only memory (ROM), a random access memory (RAM), a magnetic disk, an optical disc or the like.

It is noted, "include", "have" or any variations thereof in the present disclosure are intended to cover a non-exclusive inclusion, such that a process, a method, an article, or a device that includes a series of elements not only includes the series of elements, but also may include other elements not expressly listed or include elements inherent to the process, the method, the article, or the device. Without further limitation, an element preceded by "includes or including" does not preclude the existence of additional identical elements in the process, the method, the article, or the device including the element.

From the foregoing description of the embodiments, a person skilled in the art will appreciate clearly that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The computer software product is stored in a storage medium (e.g., an ROM/RAM, a magnetic disk or an optical disc) and includes several instructions executable by a terminal (such as a handset, a computer, a server, an air conditioner or a network device) to perform the method according to the embodiments of the present disclosure.

The embodiments of the present disclosure are described with reference to the accompanying drawings, however, the present disclosure is by no means limited to the foregoing specific embodiments, which are only illustrative rather than limiting. Having the benefit of the present disclosure, a person of ordinary skill in the art may make modifications and improvements without departing from the principle of the present disclosure and the scope of the claims, and these modifications and improvements shall fall within the scope of the present disclosure.

What is claimed is:

1. An integrity protection method, applied to a terminal, comprising:
    performing an integrity protection check on data packets transmitted on a data radio bearer (DRB), a split bearer corresponding to the DRB or a logical channel corresponding to the DRB, and determining whether an integrity protection of the DRB fails based on a result of the integrity protection check; and
    suspending the DRB or continuing receiving data packets carried by the DRB, in a case that it is determined that the integrity protection of the DRB fails;
    wherein after the determining whether the integrity protection of the DRB fails based on the result of the integrity protection check, the integrity protection method further comprises: reporting integrity protection failure information of the DRB, in a case that it is determined that the integrity protection of the DRB fails;
    wherein in a case of continuing receiving data packets carried by the DRB when it is determined that the integrity protection of the DRB fails, after the reporting the integrity protection failure information of the DRB, the integrity protection method further comprises:
    starting a timer, wherein integrity protection failure information of the DRB is not reported before the timer expires; or
    starting a counter, and incrementing a count value of the counter each time integrity protection failure information of the DRB is reported, wherein integrity protection failure information of the DRB is not reported any longer in a case that the count value of the counter reaches a preset threshold.

2. The integrity protection method according to claim 1, wherein the integrity protection failure information comprises at least one of: an identifier of the DRB, an identifier of a split bearer on which the determination that the integrity protection of the DRB fails is based, or an identifier of a logical channel on which the determination that the integrity protection of the DRB fails is based.

3. The integrity protection method according to claim 1, wherein the performing the integrity protection check on the data packets transmitted on the DRB, the split bearer corresponding to the DRB or the logical channel corresponding to the DRB, and determining whether the integrity protection of the DRB fails based on the result of the integrity protection check comprises:
    performing the integrity protection check on data packets transmitted on the DRB, and determining whether the integrity protection of the DRB fails based on a result of the integrity protection check performed on the data packets transmitted on the DRB; or
    performing the integrity protection check on data packets transmitted on a split bearer of at least two split bearers corresponding to the DRB, and determining whether the integrity protection of the DRB fails based on a result of the integrity protection check performed on the data packets transmitted on the split bearer; or
    performing the integrity protection check on data packets transmitted on a plurality of split bearers corresponding to the DRB, and determining whether the integrity protection of the DRB fails based on a result of the integrity protection check performed on the data packets transmitted on the plurality of split bearers; or
    performing the integrity protection check on data packets transmitted on a logical channel of at least two logical channels corresponding to the DRB, and determining whether the integrity protection of the DRB fails based on a result of the integrity protection check performed on the data packets transmitted on the logical channel; or
    performing the integrity protection check on data packets transmitted on a plurality of logical channels corresponding to the DRB, and determining whether the integrity protection of the DRB fails based on a result of the integrity protection check performed on the data packets transmitted on the plurality of logical channels.

4. The integrity protection method according to claim 1, wherein the determining whether the integrity protection of the DRB fails based on the result of the integrity protection check comprises:
    determining that the integrity protection of the DRB fails, in a case that it is detected that integrity protection of N data packets transmitted on the DRB, the split bearer corresponding to the DRB or the logical channel corresponding to the DRB fails, where N is a positive integer greater than or equal to 1; or
    determining that the integrity protection of the DRB fails, in a case that it is detected that integrity protection of N consecutive data packets transmitted on the DRB, the split bearer corresponding to the DRB or the logical channel corresponding to the DRB fails, where N is a positive integer greater than or equal to 2; or
    determining that the integrity protection of the DRB fails, in a case that it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or determining that the integrity protection of the DRB fails, in a case that it is detected that integrity protection of a preset proportion of data packets transmitted on the DRB, the split bearer corresponding to the DRB or the logical channel corresponding to the DRB within a preset duration fails.

5. The integrity protection method according to claim 1, wherein the suspending the DRB comprises:

suspending reception of data packets of the DRB, a split bearer on which the determination that the integrity protection of the DRB fails is based, or a logical channel on which the determination that the integrity protection of the DRB fails is based; or suspending a timer corresponding to the DRB, a split bearer on which the determination that the integrity protection of the DRB fails is based, or a logical channel on which the determination that the integrity protection of the DRB fails is based, on at least one of a radio link control (RLC) layer, a packet data convergence protocol (PDCP) layer, a media access control (MAC) layer or a service data adaptation protocol (SDAP) layer.

6. The integrity protection method according to claim 1, wherein the data packet is a packet data convergence protocol (PDCP) protocol data unit (PDU) or a PDCP service data unit (SDU).

7. An integrity protection method, applied to a base station, comprising:

transmitting, to a terminal, relevant configuration used in performing an integrity protection check on data packets transmitted on a data radio bearer (DRB), a split bearer corresponding to the DRB or a logical channel corresponding to the DRB, wherein the terminal determines whether an integrity protection of the DRB fails based on the relevant configuration;

wherein after the transmitting, to the terminal, the relevant configuration used in performing the integrity protection check on the data packets transmitted on the DRB, the split bearer corresponding to the DRB or the logical channel corresponding to the DRB, the integrity protection method further comprises: receiving integrity protection failure information of the DRB reported by the terminal;

wherein the transmitting, to the terminal, the relevant configuration used in performing the integrity protection check on the data packets transmitted on the DRB, the split bearer corresponding to the DRB or the logical channel corresponding to the DRB comprises:

configuring an expiry threshold of a timer for the terminal, wherein the terminal starts the timer after reporting the integrity protection failure information of the DRB, determines whether the timer expires by using the expiry threshold and does not report integrity protection failure information of the DRB before the timer expires; or configuring a preset threshold of a counter for the terminal, wherein the terminal increments a count value of the counter each time integrity protection failure information of the DRB is reported, and does not report integrity protection failure information of the DRB any longer in a case that the count value of the counter reaches the preset threshold.

8. The integrity protection method according to claim 7, wherein the relevant configuration is used by the terminal to perform the integrity protection check in the following manner:

performing, by the terminal, the integrity protection check on data packets transmitted on the DRB, and determining whether the integrity protection of the DRB fails based on a result of the integrity protection check performed on the data packets transmitted on the DRB; or performing, by the terminal, the integrity protection check on data packets transmitted on a split bearer of at least two split bearers corresponding to the DRB, and determining whether the integrity protection of the DRB fails based on a result of the integrity protection check performed on the data packets transmitted on the split bearer; or performing, by the terminal, the integrity protection check on data packets transmitted on a plurality of split bearers corresponding to the DRB, and determining whether the integrity protection of the DRB fails based on a result of the integrity protection check performed on the data packets transmitted on the plurality of split bearers; or performing, by the terminal, the integrity protection check on data packets transmitted on a logical channel of at least two logical channels corresponding to the DRB, and determining whether the integrity protection of the DRB fails based on a result of the integrity protection check performed on the data packets transmitted on the logical channel; or performing, by the terminal, the integrity protection check on data packets transmitted on a plurality of logical channels corresponding to the DRB, and determining whether the integrity protection of the DRB fails based on a result of the integrity protection check performed on the data packets transmitted on the plurality of logical channels.

9. The integrity protection method according to claim 7, wherein the relevant configuration is used by the terminal to perform the integrity protection check in the following manner:

determining, by the terminal, that the integrity protection of the DRB fails, in a case that it is detected that integrity protection of N data packets transmitted on the DRB, the split bearer corresponding to the DRB or the logical channel corresponding to the DRB fails, where N is a positive integer greater than or equal to 1; or determining, by the terminal, that the integrity protection of the DRB fails, in a case that it is detected that integrity protection of N consecutive data packets transmitted on the DRB, the split bearer corresponding to the DRB or the logical channel corresponding to the DRB fails, where N is a positive integer greater than or equal to 2; or determining, by the terminal, that the integrity protection of the DRB fails, in a case that it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or determining, by the terminal, that the integrity protection of the DRB fails, in a case that it is detected that integrity protection of a preset proportion of data packets transmitted on the DRB, the split bearer corresponding to the DRB or the logical channel corresponding to the DRB within a preset duration fails.

10. The integrity protection method according to claim 7, wherein the integrity protection failure information comprises at least one of: an identifier of the DRB, an identifier of a split bearer on which the determination that the integrity protection of the DRB fails is based, or an identifier of a logical channel on which the determination that the integrity protection of the DRB fails is based.

11. The integrity protection method according to claim 7, wherein, after the receiving the integrity protection failure information of the DRB reported by the terminal, the method further comprises:
   informing the terminal to suspend the DRB or continue receiving data packets carried by the DRB.

12. The integrity protection method according to claim 11, wherein suspending the DRB comprises:
   suspending reception of data packets of the DRB, a split bearer on which the determination that the integrity protection of the DRB fails is based, or a logical channel on which the determination that the integrity protection of the DRB fails is based; or
   suspending a timer corresponding to the DRB, a split bearer on which the determination that the integrity protection of the DRB fails is based, or a logical channel on which the determination that the integrity protection of the DRB fails is based, on at least one of a radio link control (RLC) layer, a packet data convergence protocol (PDCP) layer, a media access control (MAC) layer or a service data adaptation protocol (SDAP) layer.

13. A base station, comprising a processor, a memory and a program stored in the memory and executable by the processor, wherein the processor is configured to execute the program, to implement steps of the integrity protection method according to claim 7.

14. The base station according to claim 13, wherein the relevant configuration is used by the terminal to perform the integrity protection check in the following manner:
   performing, by the terminal, the integrity protection check on data packets transmitted on the DRB, and determining whether the integrity protection of the DRB fails based on a result of the integrity protection check performed on the data packets transmitted on the DRB; or
   performing, by the terminal, the integrity protection check on data packets transmitted on a split bearer of at least two split bearers corresponding to the DRB, and determining whether the integrity protection of the DRB fails based on a result of the integrity protection check performed on the data packets transmitted on the split bearer; or
   performing, by the terminal, the integrity protection check on data packets transmitted on a plurality of split bearers corresponding to the DRB, and determining whether the integrity protection of the DRB fails based on a result of the integrity protection check performed on the data packets transmitted on the plurality of split bearers; or
   performing, by the terminal, the integrity protection check on data packets transmitted on a logical channel of at least two logical channels corresponding to the DRB, and determining whether the integrity protection of the DRB fails based on a result of the integrity protection check performed on the data packets transmitted on the logical channel; or
   performing, by the terminal, the integrity protection check on data packets transmitted on a plurality of logical channels corresponding to the DRB, and determining whether the integrity protection of the DRB fails based on a result of the integrity protection check performed on the data packets transmitted on the plurality of logical channels.

15. The base station according to claim 13, wherein the relevant configuration is used by the terminal to perform the integrity protection check in the following manner:
   determining, by the terminal, that the integrity protection of the DRB fails, in a case that it is detected that integrity protection of N data packets transmitted on the DRB, the split bearer corresponding to the DRB or the logical channel corresponding to the DRB fails, where N is a positive integer greater than or equal to 1; or
   determining, by the terminal, that the integrity protection of the DRB fails, in a case that it is detected that integrity protection of N consecutive data packets transmitted on the DRB, the split bearer corresponding to the DRB or the logical channel corresponding to the DRB fails, where N is a positive integer greater than or equal to 2; or
   determining, by the terminal, that the integrity protection of the DRB fails, in a case that it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or
   determining, by the terminal, that the integrity protection of the DRB fails, in a case that it is detected that integrity protection of a preset proportion of data packets transmitted on the DRB, the split bearer corresponding to the DRB or the logical channel corresponding to the DRB within a preset duration fails.

16. The base station according to claim 13, wherein the integrity protection failure information comprises at least one of: an identifier of the DRB, an identifier of a split bearer on which the determination that the integrity protection of the DRB fails is based, or an identifier of a logical channel on which the determination that the integrity protection of the DRB fails is based.

17. A terminal, comprising a processor, a memory and a program stored in the memory and executable by the processor, wherein the processor is configured to execute the program to:
   perform an integrity protection check on data packets transmitted on a data radio bearer (DRB), a split bearer corresponding to the DRB or a logical channel corresponding to the DRB, and determine whether an integrity protection of the DRB fails based on a result of the integrity protection check; and
   suspend the DRB or continue receiving data packets carried by the DRB, in a case that it is determined that the integrity protection of the DRB fails;
   wherein the processor is further configured to: report integrity protection failure information of the DRB, in a case that it is determined that the integrity protection of the DRB fails;
   wherein in a case that the processor is configured to continue receiving data packets carried by the DRB when it is determined that the integrity protection of the DRB fails, the processor is further configured to:

start a timer after reporting the integrity protection failure information of the DRB, wherein integrity protection failure information of the DRB is not reported before the timer expires; or start a counter after reporting the integrity protection failure information of the DRB, and incrementing a count value of the counter each time integrity protection failure information of the DRB is reported, wherein integrity protection failure information of the DRB is not reported any longer in a case that the count value of the counter reaches a preset threshold.

18. The terminal according to claim 17, wherein the integrity protection failure information comprises at least one of: an identifier of the DRB, an identifier of a split bearer on which the determination that the integrity protection of the DRB fails is based, or an identifier of a logical channel on which the determination that the integrity protection of the DRB fails is based.

19. The terminal according to claim 17, wherein the performing the integrity protection check on the data packets transmitted on the DRB, the split bearer corresponding to the DRB or the logical channel corresponding to the DRB, and determining whether the integrity protection of the DRB fails based on the result of the integrity protection check comprises:

performing the integrity protection check on data packets transmitted on the DRB, and determining whether the integrity protection of the DRB fails based on a result of the integrity protection check performed on the data packets transmitted on the DRB; or performing the integrity protection check on data packets transmitted on a split bearer of at least two split bearers corresponding to the DRB, and determining whether the integrity protection of the DRB fails based on a result of the integrity protection check performed on the data packets transmitted on the split bearer; or performing the integrity protection check on data packets transmitted on a plurality of split bearers corresponding to the DRB, and determining whether the integrity protection of the DRB fails based on a result of the integrity protection check performed on the data packets transmitted on the plurality of split bearers; or performing the integrity protection check on data packets transmitted on a logical channel of at least two logical channels corresponding to the DRB, and determining whether the integrity protection of the DRB fails based on a result of the integrity protection check performed on the data packets transmitted on the logical channel; or performing the integrity protection check on data packets transmitted on a plurality of logical channels corresponding to the DRB, and determining whether the integrity protection of the DRB fails based on a result of the integrity protection check performed on the data packets transmitted on the plurality of logical channels.

20. The terminal according to claim 17, wherein the determining whether the integrity protection of the DRB fails based on the result of the integrity protection check comprises:

determining that the integrity protection of the DRB fails, in a case that it is detected that integrity protection of N data packets transmitted on the DRB, the split bearer corresponding to the DRB or the logical channel corresponding to the DRB fails, where N is a positive integer greater than or equal to 1; or determining that the integrity protection of the DRB fails, in a case that it is detected that integrity protection of N consecutive data packets transmitted on the DRB, the split bearer corresponding to the DRB or the logical channel corresponding to the DRB fails, where N is a positive integer greater than or equal to 2; or determining that the integrity protection of the DRB fails, in a case that it is detected that integrity protection of N data packets of M consecutive data packets transmitted on the DRB, the split bearer corresponding to the DRB or the logical channel corresponding to the DRB fails, where M is a positive integer greater than or equal to 2, N is a positive integer greater than or equal to 1, M is greater than or equal to N; or determining that the integrity protection of the DRB fails, in a case that it is detected that integrity protection of a preset proportion of data packets transmitted on the DRB, the split bearer corresponding to the DRB or the logical channel corresponding to the DRB within a preset duration fails.

* * * * *